Aug. 10, 1954 H. J. ZIMMER 2,686,024
FLUSH DRAIN COCK
Filed June 27, 1952
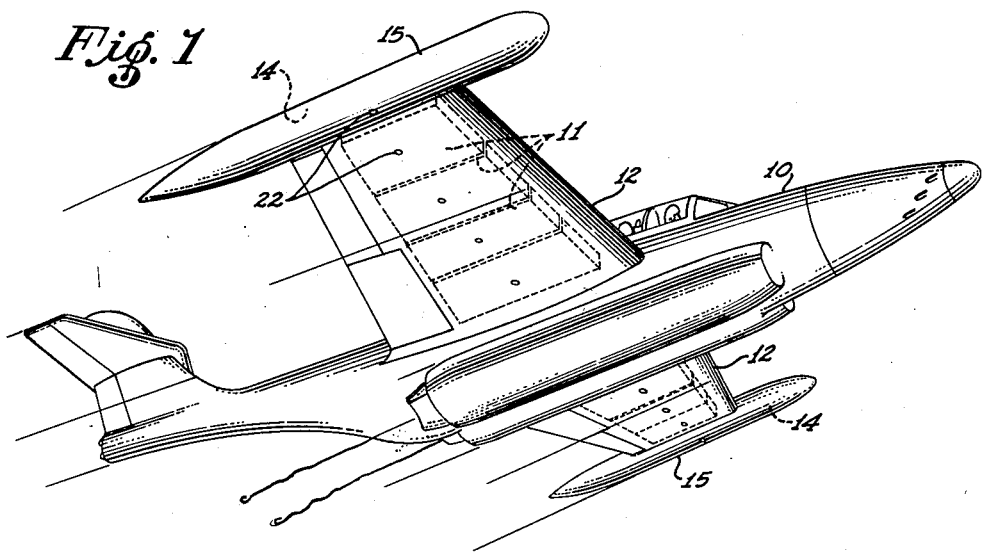
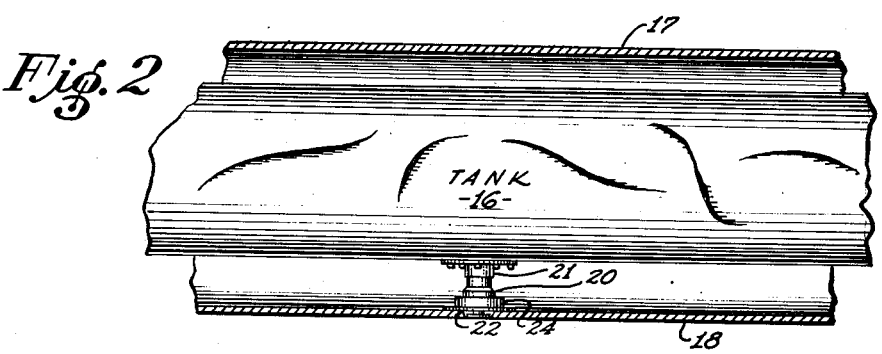
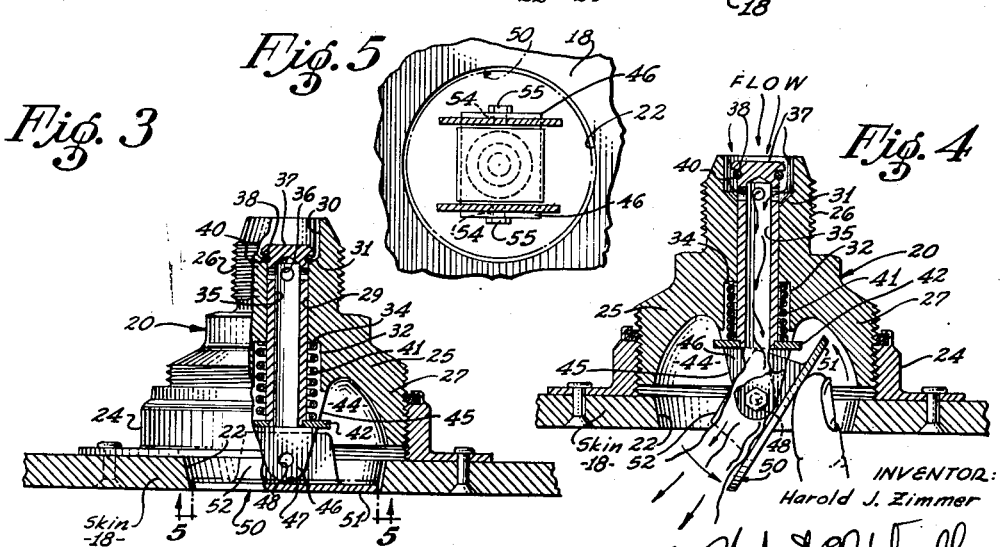
INVENTOR:
Harold J. Zimmer
By Herbert E. Metcalf
HIS PATENT ATTORNEY Patented Aug. 10, 1954

2,686,024

UNITED STATES PATENT OFFICE 2,686,024

FLUSH DRAIN COCK

Harold J. Zimmer, Eau Gallie, Fla., assignor to Northrop Aircraft, Inc., Hawthorne, Calif., a corporation of California Application June 27, 1952, Serial No. 295,970

7 Claims. (Cl. 244—135)

My invention relates to valves, and more particularly to a novel flush type valve which is exceptionally well adapted for gravity draining enclosed fluid storage tanks and the like.

In many of the current types of aircraft, both military and commercial, fuel tanks are mounted in the wings; usually being mounted in compartments between the upper and lower wing skin panels. Some military aircraft such as the U. S. A. F. F-89 jet-propelled fighter airplane, for example, also employ auxiliary fuel tanks which are mounted at the extreme outer end of each wing.

Drain valves for exterior gravity draining of tanks mounted in and outside an airplane, for example, should not extend beyond the surface of the outer skin panel and, in the case of auxiliary tanks, the outer skin panels of the tanks, inasmuch as anything projecting into the airstream on an airplane contributes to drag thereon and is undesirable.

One object of my invention is to provide a flush type drain valve for mounting in the space between a fuel tank in the wing of an airplane and the lower outer skin panel thereof.

Another object of my invention is to provide a drain valve for fluid storage tanks in enclosures; the valve being flush with the exterior of the bottom of the enclosure and concealed from view.

Still another object of my invention is to provide a gravity drain valve which is self-locking in the open or closed position thereof.

These and other objects and advantages will be readily seen in the ensuing disclosure.

Briefly, in one preferred form, the valve of the present invention comprises a valve mountable between a fluid storage tank in an enclosure and a lower wall of the enclosure, and means normally flush with the exterior surface of the enclosure to open and close the valve; the means being movable to open the valve to a position directing the resultant drainage flow away from the operator of the valve.

My invention will be more readily understood by referring to the accompanying drawings wherein:

Figure 1 is a somewhat diagrammatic view in perspective of the underside of an airplane showing a typical installation of fuel storage tanks.

Figure 2 is a fragmentary side elevational view of an airplane wing in section to show one embodiment of the present invention connected to a fuel tank enclosed in the wing.

Figure 3 is an enlarged side elevational view, partly in half section, of the valve of Figure 2 in closed position.

Figure 4 is a side elevational view, in half section, of the valve of Figure 3 in open position.

In Figure 1, a twin jet propelled fighter airplane 10 is shown, for example, wherein a number of fuel tanks 11 are enclosed in the wings 12, and auxiliary fuel tanks 14 are mounted in streamlined pods 15 attached to the outer end of each wing 12.

Referring to Figure 2, a wing tank 16 is shown, being mounted in the wing between the upper skin panel 17 and the lower skin panel 18 thereof. Normally a shallow space remains between the skin panels and the tank 16, there being the usual wing structural members, plumbing and electrical lines, etc. (none shown), therein. In the installation of the drain valve 20 of the present invention, the valve 20 is mounted to a flange coupling 21 attached to the bottom of the tank 16, and connected to the drain of a sump (not shown) mounted inside the tank for the purpose of collecting water and extraneous matter from the fuel stored therein. The lower end of the valve 20 is positioned over an aperture 22 cut in the lower skin panel 18 therefor, and mounted in another coupling 24 around the aperture 22.

In Figures 3 and 4, the detailed construction of the valve 20 of Figure 2 is shown, wherein the valve body 25 preferably has a generally bell-shaped exterior configuration carrying exterior threaded portions at each end thereof, the small male threaded portion 26 at the top end being sized to thread into the flange coupling 21 of the tank 16 shown in Figure 2, and the large lower male threaded portion 27 being threadable with a large female flange fitting 24 fastened over the aperture 22 in the usual manner.

A cylindrical duct 29 extends coaxially through the valve body 25 and is counterbored at each end thereof; the counterbore 30 at the small end providing an inner tapered valve seat 31 around the opening of duct 29, and the counterbore 32 at the large end providing a right angled inner shoulder 34, around the duct 29. A hollow cylindrical poppet 35 is slidably mounted in the duct 29 and is coaxially movable therein to cover and uncover a number of openings 36 spaced in line around the periphery of the poppet at the small end of the valve body 25. The end of the poppet 35 adjacent the small end of the valve is enclosed by a shouldered cap 37, and has an annular groove 38 extending around the periphery thereof below the cap to retain an O ring type seal 40. When the poppet 35 is bottomed in the duct 29 with the seal 40 in firm contact with the seat 31, a fluid-tight closure is provided. At the other end of poppet 35, a compression spring 41 encircles the outer periphery of the poppet 35, and abuts the inner shoulder 34 at one end thereof, the spring 41 being retained in counterbore 32 by a collar 42 affixed to the lower end of poppet 35. The spring is positioned in counterbore 42 intermediate inner shoulder 34 and collar 42 in a normally slightly compressed condition to firmly retain O ring 40 in the valve seat 31 at the upper end of poppet 35.

At the large end of valve body 25, an annular arcuate chamber 44 is concentrically formed around axial duct 29; the material around the duct 29 tapering to the large end of body 25 and terminating just short thereof. The tapered end 45 is then longitudinally and axially bifurcated to define a pair of oppositely opposed clevis arms 46, the ends of which are rounded to form a radius 47 thereon. Each arm 46 is provided with a bore 48, the bore 48 of one arm 46 being coaxially aligned with the bore 48 of the other arm 46.

To operate the valve poppet 35 a composite cover-lever member 50 is provided having a flat circular plate 51 of a diameter slightly less than the aperture 22 of skin panel 18, and a pair of parallel oppositely opposed upright lever plates 52 mounted thereon. The lever plates 52 are spaced apart by substantially the same distance as the distance between the inner faces of clevis arms 46. Each upper corner of lever plates 52 is preferably rounded to form a radius thereon. A bore 54 is drilled through the approximate center of each lever plate 52, one coaxially aligned with the other.

When assembled, cover-lever 50 is positioned intermediate the clevis arms 46 and straddled thereby, and the bores 54 and 48 respectively thereof are brought into coaxial alignment and a pin 55 or rivet is then extended through each pair of aligned bores and affixed therein to pivotally mount the cover-lever 50 opposite the open end of poppet 35. In this position it can be seen that the height of lever plates 52 from the center of the aligned bores is preferably made just slightly less than the distance between the center of bores 48 in the clevis arms 46 and the lower end of poppet 35.

To open the drain valve, the cover-lever 50 is tilted by pressure on one side thereof, to rotate about the pivot pins 55, as shown, which brings the rounded corners of the lever plates 52 to bear against the collar 42 of poppet 35. As the cover-lever 50 is further rotated, the rounded corner plates fulcrum on the collar 42 forcing poppet 35 against compression spring 41, upwardly to uncover ports 36 in the counterbore 30 at the small end of the valve, thereby permitting the flow of fluid therethrough. Here it can be seen that the flat disk portion 51 of cover-lever 50 acts to obliquely deflect the fluid flow away from the operator.

In Figure 5, a plan view of the open end of valve 20 is seen, wherein collar 42 is preferably made substantially square to provide clearance for the cover-lever 50 to swing inwardly into the arcuate chamber 44 at the large end of valve body 25.

In Figures 3 and 4, it can further be seen that, for varying thicknesses of skin 18, the valve is preferably threadably rotated in the flange coupling 24 until the outer surface of cover-lever member 50 is substantially flush therewith. A generous range of axial adjustment can be provided between the valve and the flange coupling.

It has thus been shown that while the drain valve of the present invention possesses a number of distinct advantages in use on aircraft, many other uses in other embodiments will be readily apparent to those skilled in the art.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. In combination with a tank confined in an enclosure; a valve for draining fluid from said tank comprising a valve body mounted between said tank and a wall of said enclosure, a coaxial duct through said body, one end of said duct being open to fluid in said tank, the other end of said duct being open opposite an aperture in said enclosure wall, a valve member associated with said duct to block and unblock fluid flow therethrough, and means concentrically positioned in said aperture in said wall opposite said duct opening, said means being associated with said valve member and manually movable to operate said valve member to block and unblock fluid flow through said duct, said means being normally flush with and covering said aperture when said valve member is positioned to block fluid flow through said duct.

2. In combination with a tank confined in an enclosure; a drain valve mounted between the exterior of said tank and a wall of said enclosure which comprises a valve body having a duct therethrough, one end of said duct being connected to an opening in a wall of said tank, the other end of said duct being positioned opposite an aperture in said wall of said enclosure, a valve poppet slidably mounted in said duct and coaxially movable to open and close said duct to the flow of fluid therethrough, and an aperture cover concentrically positioned in said aperture in said enclosure wall, said aperture cover being cooperatively associated with said valve poppet to move said valve poppet to open and close said duct, said aperture cover being normally flush with the outer wall surface of said enclosure when said duct is closed.

3. In combination with a fluid storage tank confined in an enclosure; a drain valve comprising a valve body mounted between the exterior of said tank and the interior wall surface of said enclosure, a duct extending coaxially through said valve body, said duct being connected at one end thereof to an opening in a wall of said tank, the other end of said duct being positioned adjacent and opposite to an aperture in the wall of said enclosure, a valve poppet slidably mounted in said duct and coaxially movable therein to open and close said duct to the flow of fluid therethrough, spring means associated with said valve poppet to maintain said valve poppet in closed position in said duct, lever means cooperatively associated with said valve poppet to move said valve poppet into open position in said duct against the force of said spring means, and an aperture cover concentrically positioned in said aperture and connected to said lever means, said aperture cover being manually operable to simultaneously uncover said aperture and move said lever means to open said duct to fluid flow therethrough, said aperture cover being normally flush with the exterior surface of said enclosure when said valve poppet is in closed position in said duct.

4. In combination with a fluid storage tank confined in an enclosure; a drain valve comprising a valve body mounted between an opening in the bottom wall of said tank and an aperture in the interior wall surface of said enclosure, a duct extending coaxially through said valve body, one end of said duct being formed to define a valve seat around said opening in said tank, the other end of said duct being positioned adjacent and opposite to said aperture in the wall of said enclosure, a valve poppet slidably mounted in said duct and coaxially movable therein, means defining a seal on one end of said poppet and adapted to seat and unseat in said valve seat in accordance with coaxial movement of said valve poppet in said duct, spring means associated with said valve poppet to maintain said poppet in a position in said duct wherein said seal is seated in said valve seat to form a fluid tight closure for said duct, lever means pivotally connected with said valve poppet and angularly movable to coaxially move said valve poppet in said duct against the force of said spring means to unseat said seal from said valve seat to open said duct, and an aperture cover concentrically positioned in said aperture, said aperture cover being cooperatively associated with said lever means; said aperture cover being angularly movable to simultaneously uncover said aperture and move said lever to open said duct, said aperture cover being normally flush with the exterior surface of said enclosure wall around said aperture when said duct is closed.

5. In combination with a fluid storage tank confined in an enclosure; a gravity drain valve comprising a valve body mounted between an opening in the bottom wall of said tank and a circular aperture in the wall of said enclosure, a duct extending coaxially through said valve body and connecting said opening in said tank wall with said aperture in said enclosure wall, the end of said duct at said tank opening defining a valve seat therein, the valve body at the other end of said duct being formed to define a hemispherical recess around said duct and said aperture and portions of said valve body centrally of said recess being formed to define a pair of oppositely opposed vertical clevis arms on either side of said duct, a valve poppet slidably mounted in said duct, one end of said poppet being formed to define a seal adapted to seat in said valve seat, said valve poppet being coaxially movable in said duct to seat and unseat said seal in said valve seat to open and close said duct to fluid flow from said tank, spring means associated with said valve poppet to maintain said seal seated in said valve seat, means defining a cam plate around the end of said valve poppet opposite said seal end thereof, lever means pivotally mounted between said clevis arms to fulcrum on said cam plate for coaxial movement of said valve poppet to seat and unseat said valve seal associated with said valve seat, and a circular cover for said enclosure aperture, said cover being concentrically positioned in said aperture and attached to said lever means, said cover being manually tiltable in said aperture and said recess to pivot said lever means for coaxial movement of said valve poppet in said duct to seat and unseat said seal to open and close said duct to fluid flow therethrough from said tank, said cover being normally flush with the exterior surface of said enclosure when said duct is closed.

6. A drain valve according to claim 5 wherein said lever means is adapted for movement past a dead center fulcrum point on said cam plate to lock said valve poppet in open position, and wherein said aperture cover is tilted to an angular position in said recess opposite said duct to angularly deflect the flow of fluid therefrom when said duct is open to fluid flow.

7. A drain valve according to claim 5 wherein said tank is a fuel tank, and wherein said enclosure is an airplane wing with said tank enclosed therein, and wherein said aperture is in the lower skin of said wing opposite the discharge end of said duct, and wherein said aperture cover provides a flush closure for said aperture to provide an aerodynamically smooth surface with the exterior surface of said wing skin when said valve is closed.

References Cited in the file of this patent

UNITED STATES PATENTS

| Number | Name | Date |
|---|---|---|
| 2,462,646 | Koehler | Feb. 22, 1949 |
| 2,573,207 | Lipman | Oct. 30, 1951 |
| 2,597,576 | Donovan | May 20, 1952 |